United States Patent Office 2,948,698
Patented Aug. 9, 1960

2,948,698

POLYAMIDE MOLDING COMPOSITIONS

Alfred Joseph Cocci, Leominster, Mass., assignor to E. I. du Pont de Nemours and Company, Wilmington, Del., a corporation of Delaware No Drawing. Filed July 31, 1957, Ser. No. 675,287

14 Claims. (Cl. 260—32.6)

This invention relates to thermoplastic polyamide molding compositions with improved processing properties and, more particularly, it relates to polyamide molding granules which are coated with trace amounts of certain carboxylic amides which coating produces a major reduction in the coefficient of friction of the molding granules.

The thermoplastic polyamide resins with which this invention is concerned are linear superpolyamides of the types first described by Carothers (U.S. Patents 2,071,250, 2,071,251, 2,071,253, and 2,130,523), which are prepared from the condensation of dicarboxylic acids or their amide-forming derivatives with stoichiometric amounts of diamines or by the homopolymerization of lactams. Examples of such polyamides include polyhexamethyleneadipamide, polyhexamethylenesebacamide, polycaprolactam, and various copolymers of hexamethylenediamine with adipic acid, sebacic acid, and caprolactam. The aforesaid superpolyamides have intrinsic viscosities in m-cresol of 0.4 or greater and preferably of 1.0 to 1.8.

The use of relatively large percentages of high boiling monoamides, particularly sulfonamides, as additives to plasticize high molecular weight thermoplastic polyamides has been known heretofore, as disclosed in U.S. Patent 2,214,405 to Coffman, issued September 10, 1940. These amide plasticizers were generally added to a preformed ribbon, filament, or object made of a polyamide resin by immersion of the preformd polyamide article in an alcoholic solution of the monoamide whereby selective absorption of the monoamide by the polyamide occurred to produce a plasticized object containing 1% to 40% by weight of the monoamide distributed throughout the polyamide. While the preferred sulfonamides could be added by mixing them into molten polyamides as an alternative procedure, it was not possible to melt the polyamides in the presence of the carboxylic monoamides because of the greater reactivity of such carboxylic monoamides with the superpolyamides. In either case, these additives, which comprised 1% to 40% by weight of the polyamide compositions, were distributed throughout the polyamide articles and served to alter the properties of these articles by plasticizing them—that is, by making them softer, clearer, and more flexible. While for certain purposes such modified properties are desirable, there are many uses for objects molded of superpolyamide resins where maximum stiffness is required and hence where such plasticization must be avoided. The present invention has as one object avoidance of such plasticization of the molded object while at the same time obtaining a very significant improvement in processability during injection molding.

In the process for fabrication of objects from superpolyamides by injection molding, two objectives—rapid production rate and complete filling of the mold—sometimes come into conflict, particularly where the mold is an intricate one in which considerable pressure must be developed within the mold in order to obtain complete filling of the mold. It is an object of this invention to obtain more rapid cycles in injection molding with polyamide molding granules by reducing the fill-time of the mold. It is another object of this invention to decrease the coefficient of friction of the solid superpolyamide molding granules, both between themselves and between the granules and the metal walls of the cylinder of the injection-molding apparatus, in order to reduce the pressure drop across the unmelted polyamide cubes in the cylinder of the injection-molding apparatus. Still another object of this invention is to obtain rapidly a maximum pressure within the mold during injection molding in order to effect complete filling of intricate molds on short cycles and so to produce substantial savings in the cost of production by increasing the rate of production while decreasing the percentage of rejects. Other objects and advantages of this invention will become apparent from the subsequent description and examples.

The objects and advantages of this invention are accomplished by the use of novel compositions comprising granules of superpolyamide molding resins coated with about 0.005 to 0.10% by weight, and preferably from 0.04 to 0.06% by weight, of a carboxylic amide from the group consisting of the monoamides of monocarboxylic acids containing from 12 to 20 carbon atoms and the ethylene-bis-diamides of said acids. The aforesaid novel compositions may suitably be prepared by dry blending, in any conventional tumbling and mixing equipment, the superpolyamide molding granules with powdered carboxylic acid derivatives of the group described. The molding granules may be in the form of cubes, parallelepipedons, spheroids, chips, or any other compacted form suitable for feeding to the ram chamber of an injection molding machine. The added carboxylic amides are readily distributed over the surfaces of the superpolyamide molding granules and in contrast to compositions obtained by prior art processes, the aforesaid carboxylic amides remain on the surfaces of the nylon granules and are not absorbed and distributed throughout the interior body of the superpolyamide resin granules. Surprisingly, it has been discovered that, by the use of these compositions, an increase of several hundred percent in the rate of filling of intricate molds can be achieved and, likewise, intricate molds can be completely filled at higher production rates while substantially eliminating wastage due to incompletely molded articles. This spectacular increase in both production rate and in uniform conformity of the molded objects is achieved, rather surprisingly, without suffering any perceptible detriment to the inherent stiffness and rigidity of objects molded from the coated superpolyamide resins. Furthermore, by the use of this invention in conjunction with high-viscosity superpolyamides, it has been possible to fill intricate molds with said high-viscosity superpolyamides which, without the use of the subject invention, could not be molded into such intricate forms. This invention is further explained and described by the following examples which are illustrative only and are not intended to limit the scope of the invention:

EXAMPLE 1

In this experiment a superpolyamide (nylon) molding resin comprising polyhexamethylene adipamide having an inherent viscosity of about 1.2 was injection molded into a gear mold using a 2 oz. vertical injection-molding apparatus. Two forms of molding granules were employed—a "slitter-cut" molding composition where the molding granules had approximately the shape of rectangular parallelepipeds, $3/32 \times 1/8 \times 1/4$ inch, and a "dicer-cut" molding composition where the molding granules had approximately the shape, $3/32 \times 1/8 \times 1/8$ inch.

Before molding, a portion of the "slitter-cut" granules was placed in a drum, and 0.05% by weight of ethylene bis-stearamide in a powdered form distributed over the surfaces of the molding cubes by rolling for about 60 minutes. The particular mixing device and time of mixing employed are not critical. A portion of the "dicer-cut" molding granules was coated by the same method with 0.05% by weight of ethylene-bis-stearamide.

For this experiment, which was designed to compare the processability of the coated molding granules with similar, but non-coated granules, a 2-oz. injection molding apparatus was operated with a 2 oz. cylinder and standard torpedo without employing either a screen pack or breaker plate; the fastest possible ram speed was employed with a 30/30 cycle (30 seconds with ram forward to inject the molten nylon resin into the mold and apply pressure to the mold, and 30 seconds with the ram back while completing cooling and setting the molded gear). The molding granules were fed to the cylinder by means of an automatic weigh feeder. The gear mold was maintained at 50° C. Three different nozzles temperatures, 275°, 265°, and 260° C., were tested at various gauge settings (G). The fill time ($\theta$) in seconds, the maximum mold pressure (PM) in pounds per square inch, and the pressure drop ($\Delta P$) in the cylinder during filling of the mold were determined under comparable conditions for the standard, non-lubricated molding granules and for the granules lubricated with the coating of ethylene-bis-stearamide. These operating conditions and results are tabulated in Table 1.

*Table 1*

EFFECT OF 0.05% ETHYLENE-BIS-STEARAMIDE AS LUBRICANT ON NYLON MOLDING GRANULES—POLYHEXAMETHYLENE ADIPAMIDE SUPERPOLYAMIDE OF INHERENT VISCOSITY 1.2

| Type Cut | Wt. percent Ethylene-bis Stearamide | Nozzle Temp., °C. | Gauge Pressure, p.s.i. | $\theta$ Time to Fill Mold, Sec. | $P_m$ Maximum Mold Pressure | $\Delta P$ Pressure Drop in Cylinder, p.s.i. |
|---|---|---|---|---|---|---|
| Dicer | 0 | 275 | 19,200 | 4.2 | 11,100 | 17,900 |
| Dicer | 0.05 | 275 | 19,200 | 2.0 | 12,300 | ~11,000 |
| Dicer | 0 | 275 | 14,400 | 9.3 | 6,700 | 13,900 |
| Dicer | 0.05 | 275 | 14,400 | 2.5 | 12,000 | ~13,000 |
| Dicer | 0 | 275 | 9,600 | 14.5 | 2,600 | |
| Dicer | 0.05 | 275 | 9,600 | 10.5 | 3,600 | 8,300 |
| Dicer | 0 | 265 | 19,200 | 7.8 | 6,600 | 18,000 |
| Dicer | 0.05 | 265 | 19,200 | 2.5 | 10,900 | ~15,000 |
| Dicer | 0 | 265 | 14,400 | 14.5 | 2,900 | ~13,000 |
| Dicer | 0.05 | 265 | 14,400 | ~2.5 | 8,100 | 14,000 |
| Dicer | 0 | 260 | 19,200 | 14.3 | 1,300 | ~17,000 |
| Dicer | 0.05 | 260 | 19,200 | 2.5 | 7,700 | ~15,500 |
| Slitter | 0 | 275 | 14,400 | ~7.5 | ~9,500 | 13,300 |
| Slitter | 0.05 | 275 | 14,400 | ~2.0 | 14,000 | 11,200 |

From an inspection of the data reported in Table 1 it is apparent that, at any given temperature and pressure, the use of the novel lubricated nylon granules results in a much more rapid filling of the mold as well as in the development of a higher maximum pressure in the mold. Furthermore, the coated nylon granules can be employed at both lower temperatures and lower gauge pressures, than can the non-coated nylon granules, to produce satisfactory moldings. From these results it is apparent that more rapid molding cycles can be employed with the coated granules.

In this group of experiments it was observed also that when the lubricated molding granules were employed there was a reduction of 5 to 15° C., at any given ram pressure, in the temperature at which flash would occur in the mold and a like reduction in the temperature at which the internal mold pressure fell to approximately zero. This provides a clear demonstration of the fact that the lubrication of the molding granules by the amide coating produces a decrease in the pressure drop across the unmelted granules in the cylinder of the injection molding apparatus.

EXAMPLE 2

The demonstration of the invention was carried out in the same injection molding apparatus as described in Example 1. In this case, however, a superpolyamide, nylon molding resin comprising polyhexamethyleneadipamide of higher molecular weight (inherent viscosity of about 1.6 to 1.7) was used. A portion of the molding granules was coated with 0.05% by weight of ethylene-bis-stearamide using the procedure described in Example 1. The processability of the coated molding granules during injection-molding of gears, as in Example 1, was compared with that of the standard, uncoated granules. Because of the higher molecular weight of the nylon resin in this case, a higher nozzle temperature, 305° C., was employed; the ram pressure gauge setting used was 14,400 p.s.i. Under these conditions, the time, $\theta$, required to fill the gear mold when using coated granules was 3.8 seconds as compared with 7.9 seconds when using uncoated granules, and the maximum mold pressure developed ($P_m$) was 9,000 p.s.i. as compared with 7000 p.s.i. with uncoated resin granules. At this same pressure, flash was observed when using amide-coated molding resin at a nozzle temperature of 305° C. while with uncoated molding resin, a nozzle temperature above 310° C. was required to produce a flash. There was approximately a 20° difference in the nozzle temperature at which the internal mold pressure ($P_m$) fell to zero; with the coated molding granules, this temperature was about 285° C. while it was nearly 305° C. when using the uncoated nylon granules. Since, when $P_m \cong 0$, there is incomplete filling of the molds, the gears obtained with this high viscosity nylon resin were incompletely formed and unsatisfactory even when molded at 305° C.; in view of the instability of polyamides above this temperature, it would be impossible to injection mold satisfactory gears of this resin in this apparatus without employing the coated molding granules of this invention. This result demonstrates unequivocably the value of the discovery of these novel coated polyamide molding granules wherever intricate moldings of the toughest (highest molecular weight) nylon resins are desired. Only by employement of this invention can such intricate molds be filled with the very high molecular weight resins without use of unusual molding equipment and without overheating and hence causing degradation of the nylon resin, and without plasticization of the resultant molded articles.

EXAMPLE 3

A 12-ounce horizontal injection molding apparatus was equipped with a 6-oz. cylinder, a standard torpedo, and breaker plate (no screen pack); a multiple comb mold was attached. The high molecular weight, high viscosity polyhexamethyleneadipamide resin described in Example 2 was employed and the processing behavior of the standard resin was compared with the behavior of the same resin coated with 0.05% by weight of ethylene-bis-stearamide. The molding granules were fed to the ram by an automatic feeder, and the ram pressure was set at maximum (22,000 p.s.i.). A 45/15 molding cycle was used. The operating conditions and results are tabulated in Table 2.

Table 2
INJECTION MOLDING OF COMBS FROM HIGH VISCOSITY NYLON RESIN—45/15 CYCLE, 22,000 P.S.I. GAUGE

| Resin Granules Used | Temperatures, ° C | | | | Comments | Inherent Viscosity of Nylon in Molded Comb |
|---|---|---|---|---|---|---|
| | Rear of Cylinder | Front of Cylinder | Nozzle | Mold | | |
| Standard—uncoated | 320 | 320 | 320 | 110 | Incompletely-mold. | 1.42 |
| Coated with 0.05% of ethylene-bis-stearamide. | 310 | 305 | 305 | 110 | Filled mold | 1.63 |

From inspection of Table 2 it is apparent that, even at a 15° C. higher temperature, the uncoated nylon molding resin could not be used with this mold. The instability of the nylon at 320° C. is evident from the reduced inherent viscosity (1.42) of the resin after molding which is conclusive evidence of molecular weight degradation and hence of reduced toughness. By contrast, the same resin molding granules, when coated according to the method described hereinabove, did fill the comb mold when molded at 305° C., and at this temperature there was no apparent degradation in molecular weight, nor was there plasticization of the resultant molded comb.

EXAMPLE 4

Demonstration of the fact that nylon moldings obtained according to this invention are not plasticized can be obtained by injection molding of tensile bars and determination of yield stress, ultimate stress, and ultimate elongation following standard methods (ASTM Test No. D638–49T, two inches per minute). For this purpose standard tensile bars (⅛ inch thick) were injection-molded using a 1-ounce, vertical apparatus equipped with standard cylinder and torpedo and 40/80/80 screen pack. A 30/30 cycle was employed with a cylinder temperature of 285° C. and with the tensile bar mold at 45° C. The results are tabulated in Table 3.

Table 3
TENSILE TESTS ON INJECTION MOLDED BARS OF NYLON RESIN—EFFECT OF 0.05% COATING OF ETHYLENE-BIS-STEARAMIDE

| Polyhexamethylene Adipamide Resin ($\eta$ inh=1.2) | Yield Stress, p.s.i. | Ultimate Stress, p.s.i. | Ultimate Elongation, Percent |
|---|---|---|---|
| Dicer cut—Uncoated molding granules | 11,000 | 7,450 | 65 |
| Dicer cut—coated molding granules | 11,200 | 7,620 | 55 |
| Cube cut—coated molding granules | 11,100 | 7,450 | 56 |

It is apparent from the data of Table 3 that no plasticization of the nylon objects molded from granules coated according to the invention resulted since there was no significant decrease in yield stress, or increase in ultimate strength and elongation.

The foregoing examples are illustrative only. Many variations in the procedures for coating the superpolyamide molding granules and in the size and shape of the molding granules can be employed without departing from the scope and spirit of this invention. Likewise many variations in the injection molding process can be adopted as would be apparent to anyone skilled in this art. Similarly, while the examples demonstrate the use of certain specific carboxylic amides as the coating additives, it must be understood that other compounds within the scope of this disclosure can be used equally well. Particularly suitable carboxylic amides within the scope of this invention are myristamide, palmitamide, stearamide, ethylene-bis-stearamide, ethylene-bis-myristamide, and ethylene-bis-palmitamide. Amides of unsaturated carboxylic acids may be employed also, such as oleamide and linoleamide.

The examples presented hereinabove have illustrated the significant improvement in injection molding behavior obtained by the use of the novel compositions of this invention. That this improvement is due principally to reduction in the surface friction between solid molding granules and between the solid granules and the walls of the molding apparatus can be shown by two simple types of experiment—measurement of bulk density and measurement of angle of repose. Low friction between individual molding granules results in tighter packing of the granules with resultant greater bulk density. Similarly this lower friction causes the granules, when poured out of a container onto a flat surface, to form a flatter conical pile—in other words, to spread out rather than to pile up. This result can be expressed as angle of repose—the angle which the sides of the conical pile make with the horizontal.

These simple experiments have been made with a number of different polyamide molding compositions. Some results with a slitter-cut polyhexamethylene adipamide are shown in Table 4.

Table 4
EFFECT OF EXTERNAL LUBRICANT ON SLITTER-CUT POLYHEXAMETHYLENE ADIPAMIDE

| Lubricant (0.05 wt. percent) | Bulk Density, g./cc. | Angle of Repose |
|---|---|---|
| None | 0.56 | 40 |
| Ethylene bis-stearamide | 0.60 | 20 |
| Stearamide | 0.62 | 20 |
| Lauramide | 0.63 | 15 |
| Adipamide | 0.58 | 30 |

The low bulk density and high angle of repose of the unlubricated resin contrasts with the values for lubricated resins. Adipamide is intermediate. It is not outstanding for use as a coating. High bulk density and low angle of repose correlate well with improved moldability as described hereinabove. This surprising improvement is a result of the decreased inter-particle friction.

The point of invention is the discovery that superpolymide molding granules, coated by dry blending, with from .005 to 0.10% by weight of a carboxylic amide chosen from the group comprising the monoamides of monocarboxylic acids containing from 12 to 20 carbon atoms and the ethylene-bis-diamides of said acids can be employed to increase the rate of injection molding often at the same time permitting the use of lower molding temperatures and pressures, and that the resultant molded articles are not plasticized. In the case of high viscosity, high-molecular weight superpolyamides, this invention makes possible the filling of intricate molds with accurate conformity which, without this discovery, could not be done even at temperatures so high that molecular weight degradation occurs.

It has been found that even as little as 0.005 by weight of any of the carboxylic amides described above will have a beneficial effect on processability when coated onto the surface of the molding granules. The optimum improvement in processability is obtained with from 0.04% to 0.06% by weight of the carboxylic amide coated onto the surface of the molding granules. No additional improvement in processability was observed even when ten times as much carboxylic amide was employed. However, when more than 0.1% by weight of the carboxylic amide was used, chemical reactivity and inadequate mixing at molding temperatures result in undesirable bubbling and disfigurement of the surfaces of molded objects. Therefore the upper practicable limit at which the coatings of this invention may be employed is 0.1% by weight. In the range of this invention, no plasticization of objects molded from these resins occurs.

I claim:

1. Nylon molding granules, particularly suitable for injection molding, comprising granules of a macromolecular superpolyamide having an intrinsic viscosity in m-cresol between 0.4 and 1.8, said superpolyamide being one which has carboxamide linkages forming an integral part of the polymer chains and which, upon hydrolysis, yields monomeric compounds selected from at least one member of the group consisting of (1) mixtures of dicarboxylic acids and diamines and (2) ω-aminomonocarboxylic acids, said granules having a coating of from 0.005% to 0.10% by weight of an aliphatic carboxylic amide selected from the group consisting of the monoamides and the ethylene-bis-diamides of the aliphatic monocarboxylic acids containing from 12 to 20 carbon atoms.

2. A composition of claim 1 wherein the superpolyamide is polyhexamethylene adipamide.

3. A composition of claim 1 wherein the superpolyamide is polyhexamethylenesebacamide with an inherent viscosity greater than 0.4.

4. A composition of claim 1 wherein the superpolyamide is polycaprolactam with an inherent viscosity greater than 0.4.

5. A composition of claim 1 wherein the aliphatic carboxylic amide is ethylene-bis-stearamide.

6. A composition of claim 1 wherein the carboxylic amide is lauramide.

7. A composition of claim 1 where the carboxylic amide is stearamide.

8. A composition of claim 1 wherein the carboxylic amide is oleamide.

9. A composition of claim 1 wherein the carboxylic amide is palmitamide.

10. Polyhexamethylene adipamide, having an intrinsic viscosity in m-cresol between 1.0 and 1.8, in the form of molding granules particularly suitable for injection molding, said granules having a coating of from 0.04% to 0.06%, by weight of an aliphatic carboxylic amide selected from the group consisting of the monoamides and the ethylene-bis-diamides of the aliphatic monocarboxylic acids containing from 12 to 20 carbon atoms.

11. A composition of claim 10 wherein the aliphatic carboxylic amide is ethylene-bis-stearamide.

12. A composition of claim 10 wherein the carboxylic amide is lauramide.

13. A composition of claim 10 wherein the carboxylic amide is stearamide.

14. A composition of claim 10 wherein the carboxylic amide is oleamide.

References Cited in the file of this patent

UNITED STATES PATENTS

| 2,071,250 | Carothers | Feb. 16, 1937 |
| 2,770,608 | Barker et al. | Nov. 13, 1956 |
| 2,770,609 | Symonds | Nov. 13, 1956 |

OTHER REFERENCES

Simonds et al.: The New Plastics, D. Van Nostrand Co., New York, 1945, pages 23 and 30.

UNITED STATES PATENT OFFICE
CERTIFICATE OF CORRECTION

Patent No. 2,948,698                      August 9, 1960

Alfred Joseph Cocci

It is hereby certified that error appears in the printed specification of the above numbered patent requiring correction and that the said Letters Patent should read as corrected below.

Column 3, line 34, for "nozzles" read -- nozzle --; line 36, for "(PM)" read -- $(P_M)$ --; columns 5 and 6, Table 2, under the heading "Comments", lines 1 and 2, for "Incompletely-mold" read -- Incompletely-filled mold --.

Signed and sealed this 4th day of April 1961.

(SEAL)
Attest: ERNEST W. SWIDER
Attesting Officer

ARTHUR W. CROCKER
Acting Commissioner of Patents